United States Patent [19]

Horn et al.

[11] Patent Number: 5,282,998
[45] Date of Patent: Feb. 1, 1994

[54] MIXTURES OF LINEAR AND CYCLIC SILOXANES OR SILOXANE OLIGOMERS AND A PROCESS FOR THEIR PREPARATION

[75] Inventors: Michael Horn; Hans-Joachim Kötzsch, both of Rheinfelden, Fed. Rep. of Germany

[73] Assignee: Hüls Aktiengesellschaft, Marl, Fed. Rep. of Germany

[21] Appl. No.: 892,254

[22] Filed: Jun. 2, 1992

[30] Foreign Application Priority Data

Jun. 8, 1991 [DE] Fed. Rep. of Germany ....... 4118921
Nov. 13, 1991 [DE] Fed. Rep. of Germany ....... 4137278

[51] Int. Cl.$^5$ .................... C07F 7/02; C07F 7/08
[52] U.S. Cl. .................... 252/182.14; 556/482; 556/450; 556/460; 556/453
[58] Field of Search .......... 556/482, 489, 450, 460, 556/453; 252/182.14

[56] References Cited

U.S. PATENT DOCUMENTS

| | | |
|---|---|---|
| 2,605,274 | 7/1952 | Tyler .................... 556/450 |
| 2,645,628 | 7/1953 | Hurd .................... 556/450 |
| 2,684,379 | 7/1954 | Guillissen et al. .......... 556/450 |
| 2,909,548 | 10/1959 | Bailey et al. ............. 556/450 |
| 5,196,559 | 3/1993 | Schulz, Jr. et al. ......... 556/460 |

*Primary Examiner*—Richard D. Lovering
*Assistant Examiner*—Valerie Fee
*Attorney, Agent, or Firm*—Felfe & Lynch

[57] ABSTRACT

Mixtures of siloxane oligomers having a degree of oligomerization of 0 to 8, which have no more than one vinyl substituent attached per silicon atom as well as methoxy and/or ethoxy groups, the molar ratio of vinyl groups to alkoxy groups being 1:1 to 1:8, and in addition optionally alkyl substituents of 1 to 18 carbon atoms, the molar ratio of vinyl groups to alkyl groups being 1:0 to 1:8, are prepared by hydrolysis or cohydrolysis of vinyltrialkoxysilanes and optionally tetraalkoxysilanes and alkyltrialkoxysilanes in alcoholic solution in the presence of an acid catalyst with an amount of water calculated for the degree of oligomerization, followed by removal of the catalyst and of the free alcohol. The siloxane oligomer mixture is useful as a crosslinking agent for thermoplastic polyolefins.

3 Claims, No Drawings

MIXTURES OF LINEAR AND CYCLIC SILOXANES OR SILOXANE OLIGOMERS AND A PROCESS FOR THEIR PREPARATION

FIELD OF THE INVENTION

This invention relates to novel mixtures of linear and cyclic siloxanes or siloxane oligomers of the formulas

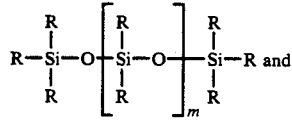  I

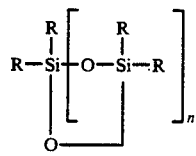  II wherein
m is an integer from 0 to 8, inclusive,
n is an integer from 2 to 8, inclusive, and
each R is independently vinyl, methoxy, ethoxy, alkyl, isoalkyl or cycloalkyl of 1 to 18 carbon atoms,
provided, however, that each silicon atom has no more than one vinyl substituent attached thereto, and the molar ratio of vinyl to alkoxy substituents is 1:1 to 1:8, and the molar ratio of vinyl to alkyl substituents is 1:0 to 1:8.

The present invention also relates to a novel process for the preparation of said mixtures by targeted, acid-catalyzed hydrolysis, and to the method of using these mixtures as crosslinking agents for thermoplastic polyolefins.

BACKGROUND OF THE INVENTION

It is known that high pressure polyethylene, which can be used to prepare high quality cable insulating compositions, can be crosslinked with vinyltrimethoxysilane. This process, however, has the particular disadvantage that vinyltrimethoxysilane is highly volatile, so that significant losses occur during processing, which has the effect of polluting the environment and, because of the toxicity of vinyltrimethoxysilane, also involves a safety hazard. On the other hand, undesirable fluctuations in the quality of the crosslinked product with respect to its dielectric properties and its mechanical values, depending on the crosslinking density and the homogeneity, are caused by the volatility of vinyltrimethoxysilane during processing. Therefore, attempts have already been made to use vinyl-tris-2-methoxyethoxysilane in place of vinyltrimethoxy-silane, and better results have been achieved in some instances. However, a very significant disadvantage is the extreme toxicity of the 2-methoxyethanol formed during the crosslinking reaction. Therefore, the tendency is to abandon this crosslinking process because of the excessively high, long-term toxicological risks. Moreover, the electrical industry now makes more stringent demands with respect to the dielectric, thermal and mechanical properties of the crosslinked cable insulating compositions than it has heretofore been possible to achieve.

For a number of applications where the demands with respect to thermal properties are more stringent, for example for hot water pipes, crosslinking of low-pressure polyethylene is important for improving the dimensional stability. However, no practicable solution has up to now been found for this problem.

OBJECTS OF THE INVENTION

It is an object of the present invention to provide crosslinking substances which do not display the disadvantages described above and which improve the physical properties of the materials in the desired manner.

Other objects and advantages of the present invention will become apparent as the description thereof proceeds.

DESCRIPTION OF THE INVENTION

We have discovered that the above objects are achieved in a simple and progressive manner by using mixtures of linear and cyclic siloxanes or siloxane oligomers of the formulas I and II above as crosslinking substances; they improve the physical and material properties, even when used in substantially lower concentrations than those heretofore required, permit clean and loss-free operation and considerably reduce the toxicological risks. In this context, the compounds of the formula I wherein m is 0 are designated as siloxanes.

The mixtures according to the present invention, which are novel, are prepared from vinyltrialkoxysilanes, optionally as a mixture with alkyltrialkoxysilanes and/or tetraalkoxysilanes, by hydrolysis or co-hydrolysis in solution of the alcohol corresponding to the alkoxy groups with an amount of water calculated for the requisite degree of oligomerization under acid catalysis, using hydrogen chloride as a catalyst, and with subsequent removal of the free alcohol and of the catalyst, for example by conventional distillative methods, and also, if appropriate, purifying the product by distillation.

Vinyltrimethoxysilane or vinyltriethoxysilane are used as the vinyltrialkoxysilanes. Examples of suitable alkyltrialkoxysilanes are
ethyltriethoxysilane,
propyltrimethoxysilane,
isobutyltrimethoxysilane,
cyclohexyltriethoxysilane,
cyclopentyltrimethoxysilane,
octyltrimethoxysilane,
dodecyltrimethoxysilane,
tetradecyltrimethoxysilane and
octadecyltrimethoxysilane.

Tetramethoxysilane or tetraethoxysilane are used as tetraalkoxysilanes.

The silanes are pre-mixed in the desired ratio, preferably at room temperature, and diluted with 0.2 to 8 times the amount by weight of alcohol, which contains the amount of water calculated for the desired degree of oligomerization as well as hydrogen chloride as the acid catalyst, and the condensation reaction is permitted to go to completion at 20° to 80° C. The hydrogen chloride concentration in the water/alcohol mixture is preferably 3 to 3,000 ppm. After the condensation reaction has gone to completion, the free alcohol and the hydrogen chloride are removed by distillation. The neutral mixtures of the linear and cyclic siloxanes or siloxane oligomers of the formulas I and II which, as a rule do not have to be further purified but can be used as such as crosslinking agents, remain in the reactor.

For use as crosslinking agents for cable insulating compositions, the mixtures according to the present invention prepared pursuant to the method described in the preceding paragraph, are grafted onto thermoplastic polyolefins in conventional manner with the aid of peroxides, and the resulting graft polymers are hydrolytically crosslinked. The physical and material properties of the products thus obtained are superior to the results obtained by the heretofore conventional methods.

The following examples illustrate the present invention and will enable others skilled in the art to understand it more completely. It should be understood, however, that the invention is not limited solely to the particular examples given below.

EXAMPLE 1

Preparation of a co-condensation product of vinyltrimethoxysilane and methyltrimethoxysilane having a vinyl:methoxy group molar ratio of about 1:3 and use of this product for polyethylene crosslinking.

(a) Preparation of the co-condensation product: 74 kg of vinyltrimethoxysilane and 44.2 kg of methyltrimethoxysilane were admixed at up to 20° C. in a reactor provided with a stirrer, a distillation apparatus and a vacuum connection. A solution of 9.28 kg of distilled water in 61.9 kg of methanol, containing 2,400 ppm of hydrogen chloride, was added to the mixture in the reactor. The temperature of the reactor contents rose to 38° C. within 31 minutes. After a total reaction time of 16 hours, the total amount of methanol (about 85 kg) including its hydrogen chloride content were completely distilled off under a pressure of about 300 mbar within about 3 hours. The resulting oligomer mixture was then distilled virtually residue-free down to a pressure of about 1 mbar in the boiling range between 48° C. and 92° C. (yield about 93 kg). The boiling point of the resulting product under normal pressure was about 214° C.

(b) Use of the product of (a) for crosslinking of polyethylene: 100 parts by weight (T) of high-pressure polyethylene were plasticized at 182° C. together with 2 T of the oligomer product obtained in (a) and 0.2 T of dicumyl peroxide and, after incorporating 0.05 T of dibutyltin dilaurate, the mixture was extruded to give standard test specimens which were crosslinked for 24 hours by treatment with water at 95° C.

Degree of crosslinking: gel fraction approximately 100% (no soluble components extractable).

| Dielectric properties | Testing | |
|---|---|---|
| | dry at room temperature | after storing in water at 90° C. for 14 h |
| Specific resistance ($\Omega$ cm) | $37.6 \times 10^{14}$ | $31.7 \times 10^{14}$ |
| Dielectric loss factor (tan $\delta$) | $6.5 \times 10^{-3}$ | $7.1 \times 10^{-3}$ |
| Dielectric constant | 3.06 | 3.1 |

These values show that the polyethylene crosslinked with the mixture according to the present invention displays very good properties even after storage in water at an elevated temperature.

EXAMPLE 2 (COMPARISON)

100 parts by weight (T) of high-pressure polyethylene were plasticized at 180° C. together with 5 T of vinyltrimethoxysilane, 0.2 T of dicumyl peroxide and 0.05 T of dibutyltin dilaurate, and the mixture was extruded to produce standard test specimens which were crosslinked over a period of 24 hours at 95° C. by treatment with water.

Degree of crosslinking: gel fraction about 72% (about 28% of soluble components extractable).

| Dielectric properties | Testing | |
|---|---|---|
| | dry at room temperature | after storing in water at 90° C. for 14 h |
| Specific resistance ($\Omega$ cm) | $8.4 \times 10^{14}$ | $3.48 \times 10^{14}$ |
| Dielectric loss factor (tan $\delta$) | $28.7 \times 10^{-3}$ | $78.7 \times 10^{-3}$ |
| Dielectric constant | 3.4 | 4.9 |

The degree of crosslinking of the polyethylene in this comparison example is incomplete. The dielectric properties after storage in water are considerably poorer than those of the dry product at room temperature.

EXAMPLE 3 (COMPARISON)

100 parts by weight (T) of high-pressure polyethylene were plasticized at 183° C. together with 2 T of vinyl-tris-(2-methoxyethoxy)-silane, 0.2 T of dicumyl peroxide and 0.05 T of dibutyltin dilaurate, and the mixture was extruded to produce standard test specimens which were crosslinked for 24 hours at 95° C. by treatment with water.

Degree of crosslinking gel fraction about 82 to 83% (about 17% of soluble components extractable).

| Dielectric properties | Testing | |
|---|---|---|
| | dry at room temperature | after storing in water at 90° C. for 14 h |
| Specific resistance ($\Omega$ cm) | $12.1 \times 10^{14}$ | $8.01 \times 10^{14}$ |
| Dielectric loss factor (tan $\delta$) | $8.9 \times 10^{-3}$ | $12.4 \times 10^{-3}$ |
| Dielectric constant | 3.23 | 3.55 |

In this case the dielectric properties of the crosslinked product after storage in water are noticeably less desirable than those of the dry product.

EXAMPLE 4

Preparation of a co-condensation product of vinyltriethoxysilane, octyltriethoxysilane and tetraethoxysilane having a vinyl:ethoxy group molar ratio of about 1:3.7, and use of this product for crosslinking of polyethylene.

(a) Preparation of the co-condensation product: 57 kg of vinyltriethoxysilane, 12.5 kg of tetraethoxysilane and 41.4 kg of octyltriethoxysilane were admixed at 20° C. in a reactor provided with a stirrer, a distillation apparatus and a vacuum connection, and a solution of 11.61 kg of distilled water in 51.4 kg of ethanol, containing 1,700 ppm of hydrogen chloride, was added to the mixture in the reactor. The temperature of the contents of the reactor rose to 34° C. within 53 minutes. After a total reaction time of 18 hours, the total ethanol (about 81 kg)

including its hydrogen chloride content was completely removed over a period of 2 to 3 hours by distillation under a pressure of about 200 mbar and towards the end at a sump temperature of about 160° C. under a full vacuum (about 1 mbar). About 92 kg of a non-volatile oligomer mixture were obtained.

(b) Use of the product of (a) for crosslinking polyethylene: 100 parts by weight (T) of high-density low-pressure polyethylene were plasticized at 239° C. together with 3 T of the oligomer product obtained in (a) and 0.2 T of di-tert.-butyl peroxide. After adding 0.05 T of dibutyltin dilaurate, the homogeneous molten polymer was extruded to produce test specimens which were crosslinked for 24 hours by treatment with water at 95° C.

Degree of crosslinking: gel fraction approximately 100% (no soluble components extractable). The polyethylene crosslinked with the aid of the mixture according to the present invention exhibited a virtually complete degree of crosslinking. The dielectric values of the product were not determined.

EXAMPLE 5 (COMPARISON)

100 parts by weight (T) of low-pressure polyethylene were plasticized at 236° C. with 5 T of vinyl-trimethoxysilane, 0.2 T of dicumyl peroxide and 0.05 T of dibutyltin dilaurate. During this operation speckling occurred. The crosslinked products were extruded to produce test specimens which were non-homogeneous and contained specks and "fish eyes."

Degree of crosslinking: gel fraction about 16%.

The degree of crosslinking of the polyethylene was incomplete. The dielectric values of the product were not determined.

EXAMPLE 6

Preparation of a condensation product of vinyltrimethoxysilane having a vinyl:methoxy group molar ratio of about 1:1.75, and use of this product for crosslinking of polyethylene.

(a) Preparation of the condensation product: A solution of 3.38 kg of water in 22.5 kg of methanol, containing 1,100 ppm of hydrogen chloride, was added at 20° C. to 44.4 kg of vinyltrimethoxysilane in a reactor provided with a stirrer, a distillation apparatus and a vacuum connection. The temperature of the reactor contents rose to 36° C. within 26 minutes. After a total of 13 hours, the total methanol (about 34.5 kg) including its hydrogen chloride content was completely distilled off under a pressure of about 300 mbar within approximately 2 to 3 hours. The resulting oligomer mixture was then distilled virtually residue-free under a pressure of about 1 mbar in the boiling point range between 45° and 90° C. (yield about 32 kg). The boiling point of the product under normal pressure was about 202° C.

(b) Use of the product of (a) for crosslinking of polyethylene: 100 parts by weight (T) of high-pressure polyethylene were plasticized at 195° C. together with 1.4 T of the oligomer product obtained in (a) and 0.14 T of dicumyl peroxide. During this operation the viscosity of the batch increased noticeably, and after adding 0.05 T of dibutyltin dilaurate the mixture was extruded to produce test specimens which were crosslinked for 24 hours by treatment with water at 95° C.

Degree of crosslinking: gel fraction about 97% (2 to 3% soluble components).

| Dielectric properties | Testing | |
|---|---|---|
| | dry at room temperature | after storing in water at 90° C. for 14 h |
| Specific resistance (Ω cm) | $19.8 \times 10^{14}$ | $8.59 \times 10^{14}$ |
| Dielectric loss factor (tan δ) | $8.5 \times 10^{-3}$ | $11.2 \times 10^{-3}$ |
| Dielectric constant | 3.11 | 3.24 |

In contrast to comparison Example 10 below, an oligomer mixture was obtained which was useful for crosslinking high pressure polyethylene.

EXAMPLE 7

Crosslinking of low-pressure polyethylene with vinylmethoxysiloxane oligomers (vinyl:methoxy group molar ratio 1:1.75).

100 parts by weight (T) of high-density low-pressure polyethylene were plasticized at 252° C. with 1 T of the oligomer product obtained in Example 6 (a) and 0.1 T of di-tert.-butyl peroxide, and after adding 0.05 T of dibutyltin dilaurate the mixture was extruded to produce test specimens which were crosslinked for 24 hours by treatment with water at 95° C.

Degree of crosslinking: gel fraction about 100% (scarcely any extractable soluble components).

The polyethylene crosslinked with this oligomer product according to the present invention exhibited a virtually complete degree of crosslinking. The dielectric values of the product were not determined.

The following example illustrates the use of tetraethoxysilane pursuant to the present invention.

EXAMPLE 8

Co-condensation product of vinyltriethoxysilane and tetraethoxysilane having a vinyl:ethoxy group molar ratio of about 1:2.8.

A mixture of 38 kg of vinyltriethoxysilane and 16.4 kg of tetraethoxysilane was reacted analogous to Example 6 (a) with a solution of 3.24 kg of water in 38.2 kg of ethanol, containing 2,600 ppm of hydrogen chloride, which yielded about 40 kg of oligomers.

The following example illustrates the use of an isoalkyltrialkoxysilane in accordance with the present invention.

EXAMPLE 9

Co-condensation product of vinyltrimethoxysilane, isobutyltrimethoxysilane and tetramethoxysilane having a vinyl:methoxy group molar ratio of about 1:2.3.

A mixture of 29.6 kg of vinyltrimethoxysilane, 20.2 kg of isobutyltrimethoxysilane and 9.1 kg of tetramethoxysilane was reacted in analogy to Example 1 with a solution of 6.66 kg of water in 71 kg of methanol which yielded about 40.8 kg of oligomer.

EXAMPLE 10 (COMPARISON)

In analogy to Example 6, a solution of 3.38 g of water in 22.5 g of methanol, containing 1,000 ppm of hydrogen chloride, was added to 44.4 g of vinyltrimethoxysilane at 20° C., and the mixture was stirred for 36 hours at 40° C. Distillation of the reaction mixture yielded about 30 g of methanol, about 21 g of vinyltrimethoxysilane and about 12 g of solid polymer residue. In this comparison example the hydrogen chloride catalyst remained in the reaction mixture. The condensation product mixture separated into monomer and high molecular weight polymer.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A mixture of linear and cyclic siloxanes or siloxane oligomers of the formulas

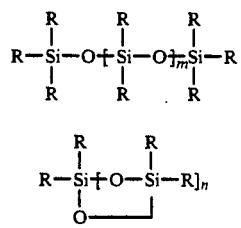

wherein
   m is an integer from 0 to 8, inclusive,
   n is an integer from 2 to 8, inclusive, and
   each R is independently vinyl, methoxy, ethoxy, alkyl, isoalkyl or cycloalkyl of 1 to 18 carbon atoms, provides, however, that each silicon atom has no more than one vinyl substituent attached thereto, and the molar ratio of vinyl to alkoxy substituents is 1:1 to 1:8, and the molar ratio of vinyl to alkyl substituents if 1:1 to 1:8.

2. The method of preparing a mixture of linear and cyclic siloxanes or siloxane oligomers of the formulas

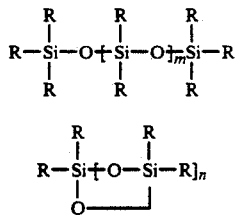

wherein
   m is an integer from 0 to 8, inclusive,
   n is an integer from 2 to 8, inclusive, and
   each R is independently vinyl, methoxy, ethoxy, alkyl, isoalkyl or cycloalkyl of 1 to 18 carbon atoms, provided, however, that each silicon atom has no more than one vinyl substituent attached thereto, and the molar ratio of vinyl 1 to alkoxy substituents is 1:1 to 1:8, and the molar ratio of vinyl to alkyl substituents is 1:0 to 1:8, by means of a targeted, acid-catalyzed hydrolysis, which comprises subjecting a vinyltrialkoxysilane, an alkyltrialkoxysilane or a tetraalkoxysilane to a condensation at 20° to 80° C. in the presence of hydrogen chloride as the catalyst with a solution of the calculated amount of water in 0.2- to 8-fold amount by weight of methanol or ethanol, based on the amount of silane starting compound, and removing the catalyst and the free alcohol from the reaction mixture.

3. The method of claim 2, wherein the hydrogen chloride concentration in the water/alcohol solution is from 3 to 3,000 ppm.

* * * * *

UNITED STATES PATENT AND TRADEMARK OFFICE
CERTIFICATE OF CORRECTION

PATENT NO. :  5,282,998
DATED      :  February 1, 1994
INVENTOR(S):  Michael Horn et al.

It is certified that error appears in the above-indentified patent and that said Letters Patent is hereby corrected as shown below:

Column 6, line 61:  "1,000 ppm" should read --1,100 ppm--;

Column 7, line 35:  "1.1" should read --1:0--.

Signed and Sealed this

Twentieth Day of September, 1994

Attest:

BRUCE LEHMAN

Attesting Officer        Commissioner of Patents and Trademarks